(No Model.)　　　　　　　　　　　　　　　　　　　2 Sheets—Sheet 1.
C. A. BIKLE.
CLOVER THRASHER AND HULLER.
No. 310,246.　　　　　　　　　　　Patented Jan. 6, 1885.
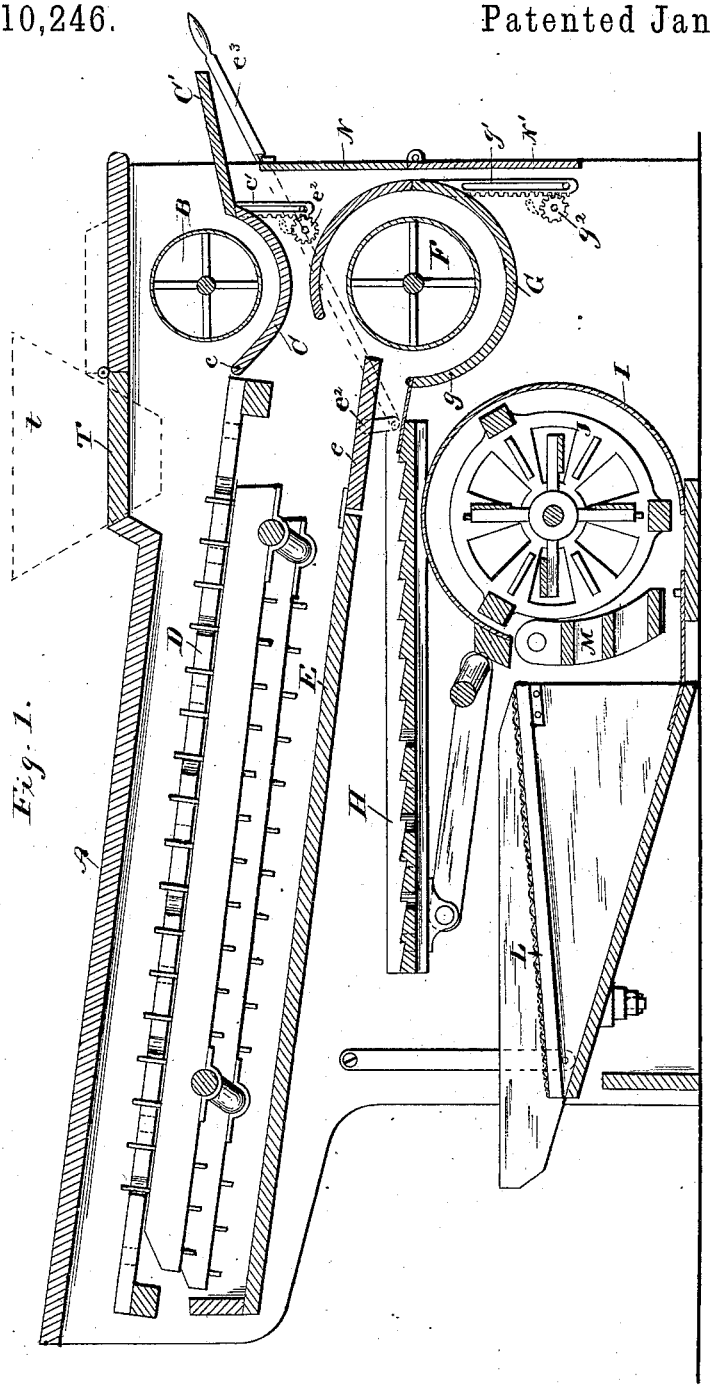
WITNESSES
Chas. R. Burr
Fred F. Church
INVENTOR
Charles A. Bikle
by
Church & Church
His Attorneys (No Model.) 2 Sheets—Sheet 2.
C. A. BIKLE.
CLOVER THRASHER AND HULLER.
No. 310,246. Patented Jan. 6, 1885.
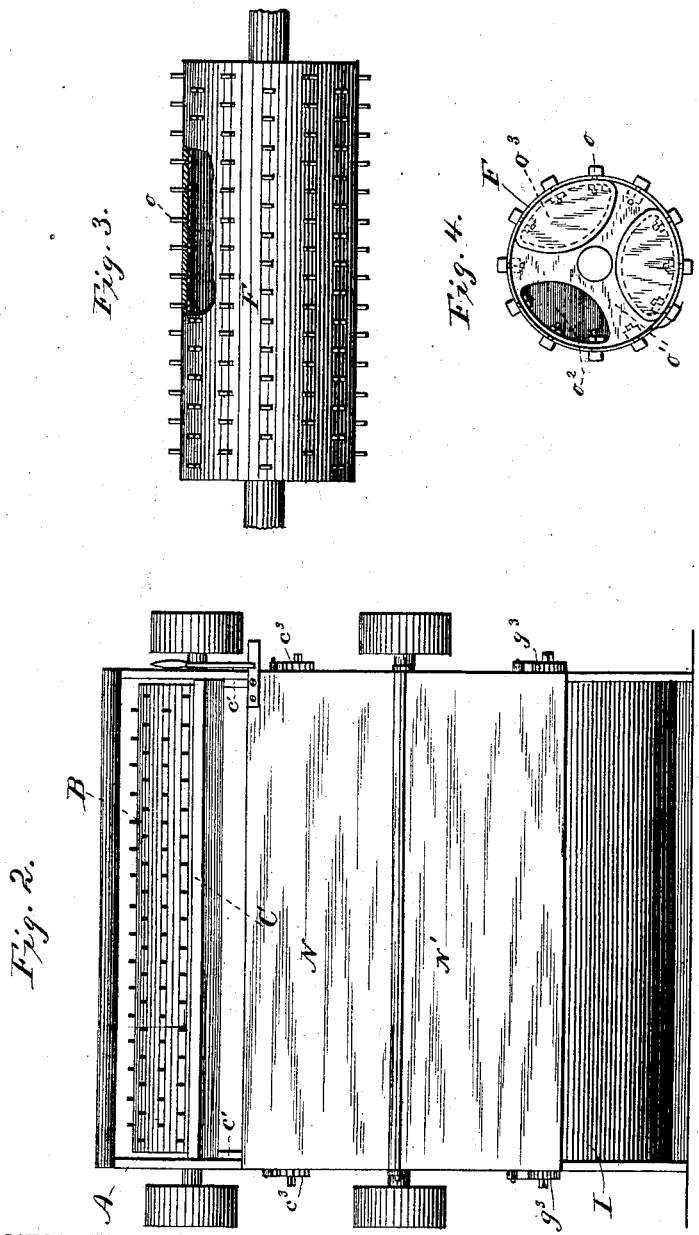
WITNESSES
Chas R. Burr
Fred F. Church
INVENTOR
Charles A. Bikle
by Church & Church
his Attorneys

UNITED STATES PATENT OFFICE.

CHARLES A. BIKLE, OF HAGERSTOWN, MARYLAND.

CLOVER THRASHER AND HULLER.

SPECIFICATION forming part of Letters Patent No. 310,246, dated January 6, 1885.

Application filed April 30, 1884. (No model.)

*To all whom it may concern:*

Be it known that I, CHARLES A. BIKLE, of Hagerstown, in the county of Washington and State of Maryland, have invented a certain new and useful Improvement in Clover Thrashers and Hullers; and I do hereby declare the following to be a full, clear, and exact description of the same, reference being had to the accompanying drawings, forming a part of this specification, and to the figures and letters of reference marked thereon.

My present invention is designed more particularly as an improvement upon that class of machines described in the patent granted to me April 22, 1884, and numbered 297,104, to which it is here shown applied, by way of illustration; and it consists in certain novel features of construction, which I will first describe, and then point out particularly in the claims at the end of this specification.

In the accompanying drawings, Figure 1 is a longitudinal section of a machine with my present improvements applied thereto. Fig. 2 is an end view of the same, and Figs. 3 and 4 are detail views of the hulling-cylinder.

Similar letters of reference in the several figures indicate the same parts.

A is the casing of the machine; B, the thrashing-cylinder; C', the upper feed-board; C, the thrashing-concave; D, the carrier and pod-separator; E, the partition or platform upon which the pods are received; $c$, the lower feed-board; F, the hulling-cylinder; G, the hulling-concave; H, the conveyer and seed-separator; I, the fan-casing; J, the blast-regulator; L, the sieve, and M the blast-deflector. These several parts are arranged and combined for mutual co-operation in substantially the manner and for the purposes set forth in my before-mentioned patent of April 22, 1884. In the present instance both the thrasher-concave C and the hulling-concave G are made adjustable, being supported, as at $c\,g$, upon a rod or hinge, and the front portion raised and lowered and sustained in position by the slotted and toothed links $c'\,g'$, pinions $c^2\,g^2$, and ratchets $c^3\,g^3$, or any other well-known form of adjusting mechanism adapted for the purpose. The casing I, containing the blast mechanism, is located at such a distance below and behind the hulling-concave that the latter can be readily swung downward a sufficient distance to permit access to the cylinder and concave, both of which latter, being liable to become clogged, require constant attention on the part of the operator. In like manner the thrasher-concave C is elevated a suitable distance above the hulling mechanism to permit its concave and cylinder to be in like manner exposed for the purpose of clearing the teeth or removing or repairing any portion of the same. This arrangement of the thrashing and hulling mechanism at the front of the machine, and the separating and cleaning mechanism below and behind the same, is of great importance, in that it permits the use of the adjustable concaves and the direct exposure of the cylinders and concaves at a point where they can readily be inspected and repaired without necessitating the removal of any of the operating mechanism. Moreover, every facility is afforded the operator to inspect closely and repair conveniently the operating parts as they are exposed to the light, and his operations are not embarrassed by the proximity of other parts of the machine. To facilitate the inspection and repair of these parts, and at the same time properly cover and protect them, the front of the machine is provided with the end board, N, and a hinged or movable board, N', which latter can be readily removed or swung up against the board N and there held when the hulling-concave is to be lowered. The teeth $o$ of the hulling-cylinder are made with square or angular shanks and threaded extremities, and instead of being driven into the sockets in the cylinder they are passed through the barreling of the cylinder, and are held in place by nuts on the inside of the cylinder.

In order to permit access to the interior of the cylinder and to the nuts on the teeth, I have constructed the end plates of heads $o'$ with openings $o^2$ of sufficient size to permit the workman to readily operate within the cylinder, these openings $o^2$ each being provided with a cover, $o^3$, to exclude the seed, hulls, &c., which would otherwise be deposited within the cylinder, said covers being hinged, screwed, or otherwise fastened so as to be readily removed when necessary.

It not infrequently happens that roots, sticks, stones, or other hard substances are presented to the thrashing-cylinder with the straw. Such substances, if small enough, may pass through the thrashing mechanism with more or less damage to the teeth, but when delivered to the hulling mechanism much greater damage ensues, the teeth being smaller and more numerous and the concave adjusted much closer to the cylinder. The operator is made aware of the passage of the foreign substance by the noise made in going between the cylinder and concave, and to provide a means for stopping the delivery of material to the hulling-cylinder, (whether from the cause mentioned or otherwise it becomes advisable so to do,) I have mounted the feed-board $e$ on pivots $e^2$ at or near the center thereof, and attached to one of the pivots a crank-arm, to which is pivoted a connecting-rod, $e^3$, in convenient position to be grasped by the operator. The operating-handle of the rod $e^3$ being arranged alongside the feed-board of the thrashing-cylinder, the operator feeding the machine, upon hearing the noise produced by sticks, stones, or other foreign material passing under the thrashing-cylinder, is enabled, by means of the operating-handle at his side, to quickly lift the lower feed-board, so as to direct the materials from the hulling cylinder and concave and prevent injury to the latter.

Back of the thrashing-cylinder, and in the top of the machine, is arranged an opening through which can be inserted, if desired, a hopper, $t$. (Shown in dotted lines.) The opening is covered by the lid T, and is located above the pivoted feed-board, and is so arranged that the tailings or litterings can readily be delivered onto the conveyer H without passing through the thrashing or hulling mechanism, thus avoiding the injurious effects produced by said mechanism upon the seed when in the condition mentioned.

Having thus described my invention, what I claim as new, and desire to secure by Letters Patent, is—

1. In a hulling cylinder, the combination of the removable teeth, screw-threaded and fastened by nuts, as described, the perforated cylinder, the open heads, and the removable covers, substantially as described.

2. In an organized clover huller and thrasher, and in combination with the cylinders and concaves arranged at the front of the casing, as described, the separating and cleaning mechanism arranged in rear of the said thrashing and hulling devices, the pivoted feed-board or cut-off located in front of the hulling-cylinder beneath the receiving end of the carrier and pod-separator, and the movable lid in the casing above the said feed-board or cut-off, substantially as and for the purpose set forth.

3. In a clover-huller, the combination of the thrashing-cylinder and its concave, the carrier and pod-separator, the partition or platform upon which the pods are received, the hulling-cylinder and concave, the conveyer and seed-separator, and the pivoted feed-board or cut-off, having the operating handle arranged alongside the feed-board of the thrashing-cylinder, substantially as described.

CHARLES A. BIKLE.

Witnesses:
A. S. STEUART,
CHAS. R. BURR.